US008456113B2

(12) United States Patent
Lexer et al.

(10) Patent No.: US 8,456,113 B2
(45) Date of Patent: Jun. 4, 2013

(54) ELECTRIC SWITCH

(75) Inventors: Christof Lexer, Jestetten (DE); Jens Müller, Tuttlingen (DE); Andreas Seidel, Gottmadingen (DE); Norbert Papok, Lottstetten (DE); Michael Tröndle, Albruck-Birndorf (DE)

(73) Assignee: Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 13/221,048

(22) Filed: Aug. 30, 2011

(65) Prior Publication Data

US 2012/0056566 A1 Mar. 8, 2012

Related U.S. Application Data

(63) Continuation of application No. PCT/DE2010/000256, filed on Mar. 10, 2010.

(30) Foreign Application Priority Data

Mar. 11, 2009 (DE) ........................ 10 2009 012 715

(51) Int. Cl.
*H02K 7/10* (2006.01)

(52) U.S. Cl.
USPC ............................ 318/362; 318/374; 318/369

(58) Field of Classification Search
USPC ............ 318/362, 369, 374, 375, 376, 400.26, 318/400.27, 799
See application file for complete search history.

(56) References Cited

U.S. PATENT DOCUMENTS

| | | | | |
|---|---|---|---|---|
| 5,289,047 | A * | 2/1994 | Broghammer | 307/125 |
| 5,644,112 | A * | 7/1997 | Geiger et al. | 200/1 R |
| 5,798,584 | A * | 8/1998 | Schaeffeler et al. | 310/50 |
| 6,236,177 | B1 * | 5/2001 | Zick et al. | 318/362 |
| 6,262,380 | B1 * | 7/2001 | Sasaki et al. | 200/6 BB |
| 6,448,727 | B1 * | 9/2002 | Rotterhusen | 318/375 |
| 6,741,051 | B2 * | 5/2004 | Chu | 318/376 |

FOREIGN PATENT DOCUMENTS

| | | | |
|---|---|---|---|
| DE | 482 300 | A | 8/1929 |
| DE | 41 14 854 | A1 | 11/1992 |
| DE | 44 29 962 | A1 | 2/1996 |
| DE | 197 22 709 | A1 | 12/1997 |
| EP | 0 489 342 | A2 | 6/1992 |
| EP | 2 019 399 | A2 | 1/2009 |

* cited by examiner

*Primary Examiner* — Antony M Paul
(74) *Attorney, Agent, or Firm* — Burr & Brown

(57) ABSTRACT

An electric switch for an electric tool with an electric motor. The switch has first electrical terminals for electrical connection to a voltage supply and second electrical terminals for electrical connection to the electric motor. The switch has an actuating mechanism which can be adjusted between an initial position and a final position, wherein the electric motor is switched off when the actuating mechanism is located in the initial position and is switched on when the actuating mechanism is not located in the initial position. The switch also has a braking circuit for braking the electric motor, the braking circuit operating when the actuating mechanism is reset to the initial position. The switch also has a reversal circuit for switching over the direction of rotation of the electric motor. The braking circuit is arranged between the second electrical terminals and the reversal circuit.

9 Claims, 4 Drawing Sheets

ELECTRIC SWITCH

CROSS REFERENCE TO RELATED APPLICATIONS

This application is a continuation of International Application No. PCT/DE2010/000256 filed Mar. 10, 2010, which designated the United States, and claims the benefit under 35 USC §119(a)-(d) of German Application No. 10 2009 012 715.1 filed Mar. 11, 2009, the entireties of which are incorporated herein by reference.

FIELD OF THE INVENTION

The invention relates to an electric switch.

BACKGROUND OF THE INVENTION

Such switches are used for electric tools with an electric motor, for example for handheld electric tools, such as electric drills, hammer drills, electric screwdrivers or the like.

Such an electric switch, which is known from DE 41 14 854 A1, has a switch housing with first electrical terminals for the electrical connection to a voltage supply and second electrical terminals for the electrical connection to the electric motor. The switch has an actuating mechanism which can be adjusted between an initial position and a final position manually by the user, wherein the electric motor is switched off when the actuating mechanism is located in the initial position and is switched on when the actuating mechanism is not located in the initial position, i.e. when the actuating mechanism is actuated by the user, for operation thereof. If appropriate, the switch can have a control device for operating, and specifically for the open-loop and/or closed-loop control of, the electric motor, such as the speed, torque or the like thereof, depending on the displacement path of the actuating mechanism. Furthermore, the switch is provided with a braking circuit for braking the electric motor, said braking circuit operating when the actuating mechanism is reset to the initial position. Finally, a reversal circuit for switching over the direction of rotation of the electric motor is also arranged in the switch.

In the case of the known switch, the mechanical braking circuit is realized, by means of an electromechanical switching contact, in the form of a braking contact which is arranged in the switch housing electrically upstream of the mechanical changeover switch for the direction of rotation and the electrically downstream motor terminals. The same arrangement is also possible in principle when using an electronic brake instead of the braking contact. In a normal case, the changeover switch for the direction of rotation of the electric motor is switched while the electric motor is switched off, i.e. in the deenergized state. In the event of very rapid actuation of the reversal circuit by the user, specifically even before the braking operation has come to an end, it may also arise, however, that the switchover contact of the reversal circuit interrupts the induced braking current as it is switched over. In this case, the electric motor continued to run, with the brake being arranged downstream of the changeover switch when seen from the motor. Then, the changeover switch switches on the electric motor again unintentionally since the blocking diode operates in the forward direction as a result of the changeover which has taken place, for example.

In this specific case, the changeover switch is therefore not a no-load switch as it is switched over. As a result, the changeover switch in the reversal circuit, as well as the other mechanical contacts switching on load in electrical switches, is subjected to mechanical and electrical wear as a result of abrasion of and/or a change in the contact material over the life of said changeover switch. This wear takes place primarily as a result of the arc ripping away during switching-off, but also during switching-on. The wear of the contact material over the life results in an increase in the contact resistance and therefore in possibly impermissible heating of the contact points in the reversal circuit. Given correspondingly high currents, this can lead to further wear and/or welding of the contacts. At the latest when the contacts have been completely worn, this results in failure of the switch. In addition, for reasons of costs in electric tool switches most of the changeover switches for the direction of rotation are configured in the form of sliding switches which are normally designed for off-load switching, with the result that primarily the abovementioned switchover operations are very damaging during the braking operation for the changeover switch.

SUMMARY OF THE INVENTION

The invention is based on the object of developing the electric switch in such a way that the electrical wear on the mechanical contacts is reduced and therefore in particular the life, reliability and switching safety of the switch are increased. In particular, the intention is to relieve the load on the switchover contact in an economical manner in the case of the electric tool switch, through which all of the current flows to and/or from the motor.

In the electric switch according to the invention, the braking circuit is arranged between the second electrical terminals, i.e. the motor terminals, and the reversal circuit. In order to relieve the load on the changeover switch for the direction of rotation prior to the high braking currents and possible clearing of the braking current in the event of rapid switchover, according to the invention the braking contact or the electrical brake is therefore positioned electrically upstream of the changeover switch when viewed from the motor. As a result, the changeover switch is no longer loaded by the braking current since the induced current no longer flows through said changeover switch during the switchover operation. An off-load switchover contact during switching over of the direction of rotation is therefore achieved by the braking contact or the electric brake being arranged on the motor side in an electric switch for an electric tool, in particular for a DC power tool.

In a manner known per se, the switch can have a control device for operating the electric motor. With the aid of the control device, open-loop and/or closed-loop control of the electric motor is preferably therefore enabled depending on the displacement path of the actuating mechanism. For example, the user can adjust the speed, the torque or the like of the electric motor in the manner of a “boost” function by corresponding manual adjustment of the actuating mechanism.

The electric switch can have a switching contact for the voltage supply in, order to isolate the electric motor from the voltage supply when the electric tool is not in use. For this purpose, the actuating mechanism has a switching effect on the switching contact for operating the electric motor when said actuating mechanism is moved out of and/or into the initial position.

Expediently, this switching contact is located between the first electrical terminals, i.e. the terminals of the switch for the voltage supply, and the control device.

In a further configuration, the control device can be arranged between the first electrical terminals, i.e. the battery terminals, and the reversal circuit. In a manner known per se, the braking circuit can be in the form of a mechanical switching contact for short-circuiting the electric motor. As an alternative, it is also possible for the braking circuit to be in the form of an electronics unit for the short-circuiting braking of the electric motor. In this case, it is expedient with a view to achieving soft and gentle braking if the electronics unit is operated in clocked fashion.

The reversal circuit can have mechanical switchover contacts for making alternate contact with the second electrical terminals, i.e. the motor terminals, for the reversal of the direction of rotation of the electric motor. It is likewise possible for the reversal circuit for electronically operating reversal of the direction of rotation to be provided with a power circuit. The power circuit can have in each case one branch with a respective power semiconductor for the clockwise and counterclockwise operation of the electric motor.

The advantages achieved by the invention consist in particular in that the changeover switch for the direction of rotation can be produced in a particularly inexpensive manner since said changeover switch is no longer loaded by the braking current during normal operation, i.e. when switchover takes place during the braking operation. The complexity involved for the changeover switch is therefore reduced, which means that this saving can be used for reinforcing and/or improving the brake or the braking contact, for example. It is furthermore advantageous that, in the event of very rapid switchover, no wear on the contacts can take place. If there is any such wear, the changeover switch now only needs to switch on the current. It is not necessary for the contacts to be interrupted since the switching point at which the changeover switch is open is still protected by the brake. Such a switch-on operation is the case when the braking operation has not yet come to a conclusion, but the braking contact is open again by virtue of renewed pressure being applied to the pushbutton, i.e. when the actuating mechanism is moved by the user, and the induced residual current of the motor is dissipated via the blocking diode, which now operates for the braking current in the forward direction after the switchover operation.

BRIEF DESCRIPTION OF THE DRAWINGS

Exemplary embodiments of the invention with various developments and configurations are illustrated in the drawings and will be described in more detail below.

DETAILED DESCRIPTION OF THE INVENTION

Figure 4:
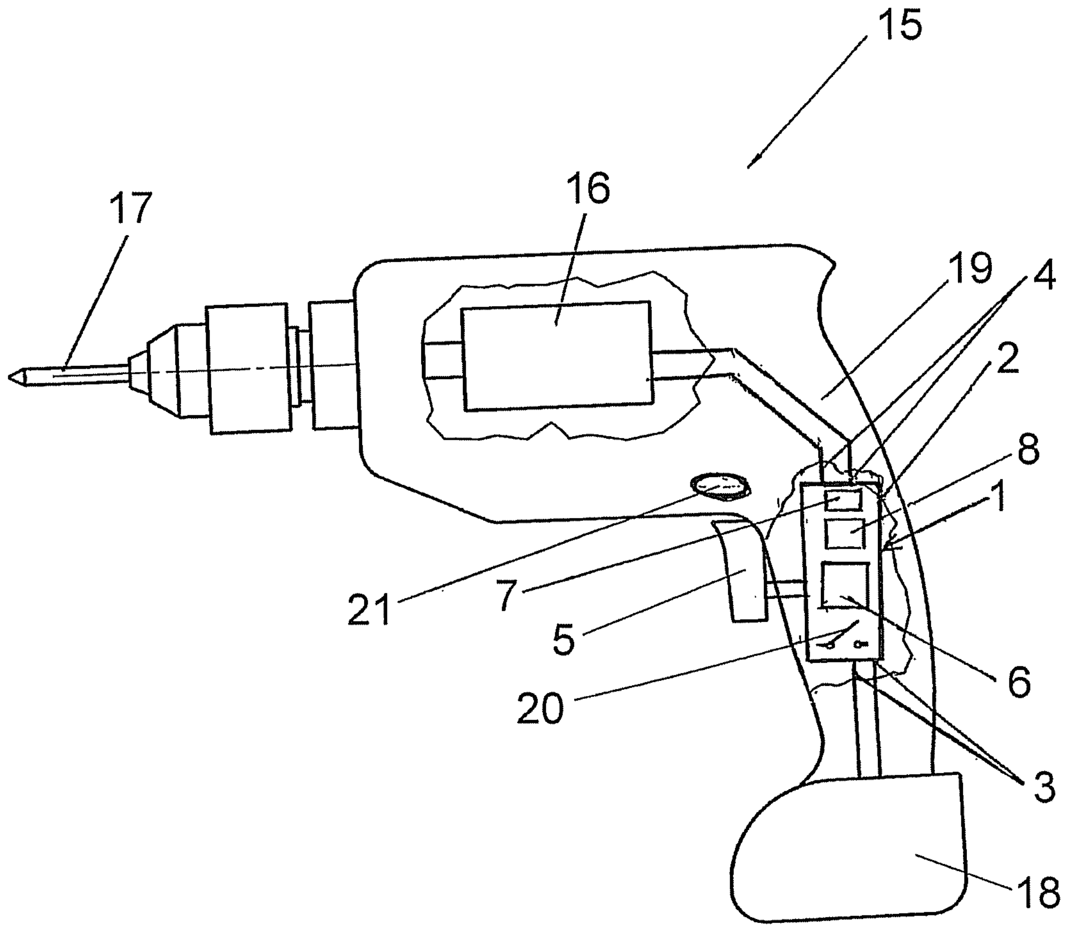
FIG. 4 shows a schematic illustration of an electric tool, with the housing of the electric tool being partially broken away.

FIG. 4 shows an electric tool 15 with an electric motor 16 for driving a tool 17. The electric tool in this case may be a rechargeable and/or mains-powered electric tool. By way of example, FIG. 4 shows a rechargeable drill as the electric tool 15, which is operated on a supply voltage from a mobile energy store 18 in the form of a rechargeable battery. It is of course also possible for the electric tool 15 to be another type of electric drill, a hammer drill, an electric screwdriver, a grinder, a saw, a plane, an angle grinder or the like.

Figure 1:
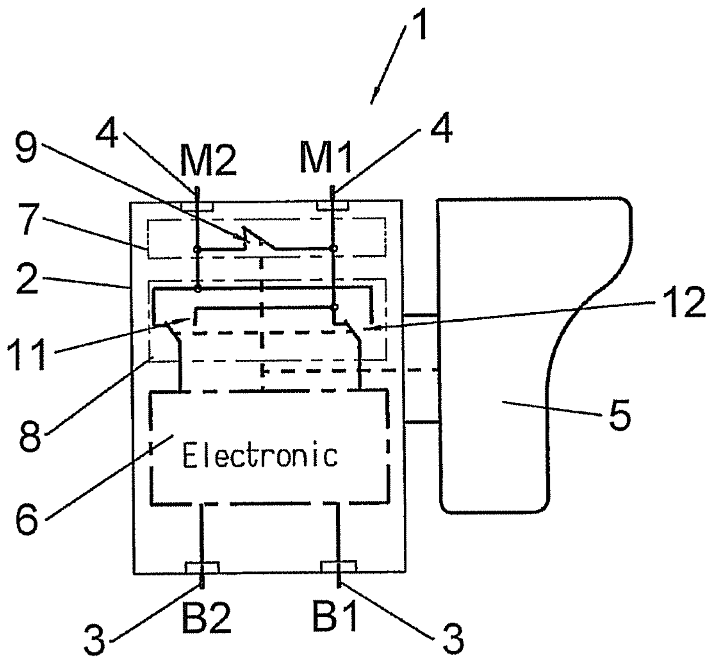
FIG. 1 shows an electric switch in accordance with a first embodiment in a schematic view.

An electric switch 1 with a housing 2 is arranged in the housing 19 of the electric tool 15. The switch 1 is accommodated in the housing 19 of the electric tool 15 in such a way that an actuating mechanism 5 of the switch 1 protrudes out of the housing 19, it being possible for said actuating mechanism to be moved manually by the user. The switch 1 has a housing 2, as can be seen in FIG. 1, into which first electrical terminals 3 (denoted by B1, B2) for the electrical connection to the voltage supply 18 are passed. The switch 1 is in this case intended for a rechargeable electric tool, whereby it is possible for the battery terminals 31, 32 at the energy store 18 to be connected to the corresponding terminals 3. Furthermore, second electrical terminals 4 (denoted by M1, M2) for the electrical connection to the electric motor 16 shown in FIG. 4 are arranged on the housing 2 of the switch 1.

Furthermore, the switch 1 comprises the actuating mechanism 5, which can be adjusted by the user between an initial position and a final position. If the actuating mechanism 5 is located in the initial position, the electric motor 16 is switched off. If, on the other hand, the actuating mechanism 5 is moved correspondingly by the user such that the actuating mechanism 5 is located outside of the initial position, i.e. is no longer located in the initial position, the electric motor 16 is switched on. For this purpose, the switch 1 has a contact system with a switching contact 20 (shown schematically in FIG. 4), on which the actuating mechanism 5 has a corresponding switching effect as said switching mechanism is moved out of and/or into the initial position, with the result that the voltage supply from the energy store 18 for the electric tool 15, to be precise in particular for operating the electric motor 16, can be switched on and/or off by the user by means of the actuating mechanism 5.

In this case, the switch 1 is also used for the user-dependent operation of the electric motor 16, to be precise for adjusting the speed, torque or the like thereof, for which purpose a control device 6 configured in the form of an electronics unit for the open-loop and/or closed-loop control of the electric motor 16 is arranged in the housing 2 of the switch 1. The control device 6 operates the electric motor depending on the displacement path of the actuating mechanism 5, which is in turn moved correspondingly by the user. When the actuating mechanism 5 is reset to the initial position, i.e. when the user releases the actuating mechanism 5, a braking circuit 7 for braking the electric motor 16 comes into operation. Finally, a reversal circuit 8 for switching over the direction of rotation of the electric motor 16 is also located in the housing 2 of the switch 1, whereby it is possible, by means of the reversal circuit 8, for the user to select between clockwise and counterclockwise operation of the electric motor 16. In order to select the direction of rotation of the electric motor 16, the user actuates an actuating element 21 (shown in FIG. 4) which is in the form of a slide, is located on the housing 19 of the electric tool 15 and acts correspondingly on the reversal circuit 8.

As is shown in FIG. 4, the switching contact 20 is located between the first electrical terminals 3 and the control device 6. As can further be seen from FIG. 1, the braking circuit 7 is arranged electrically between the second electrical terminals 4 and the reversal circuit 8. The control device 6 is arranged between the first electrical terminals 3 and the reversal circuit 8.

Figure 2:
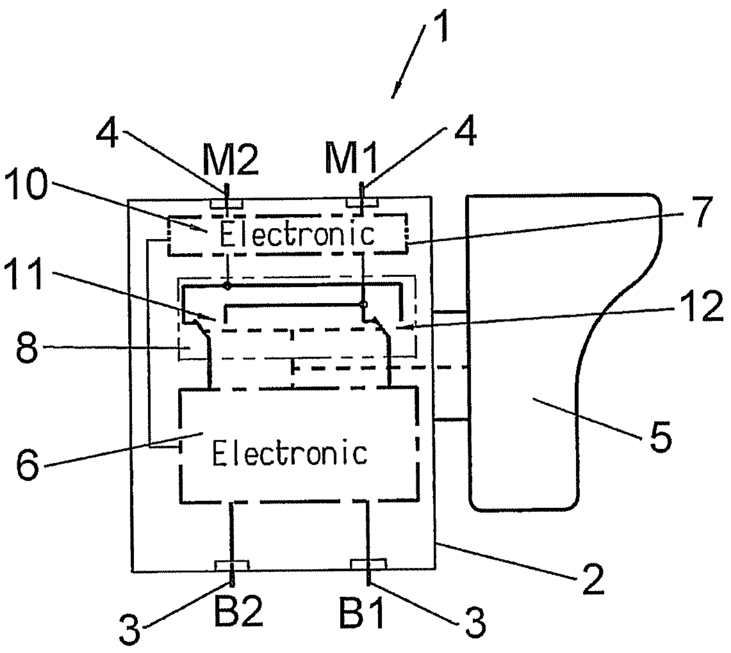
FIG. 2 shows an electric switch in accordance with a second embodiment in a schematic view.
Figure 3:
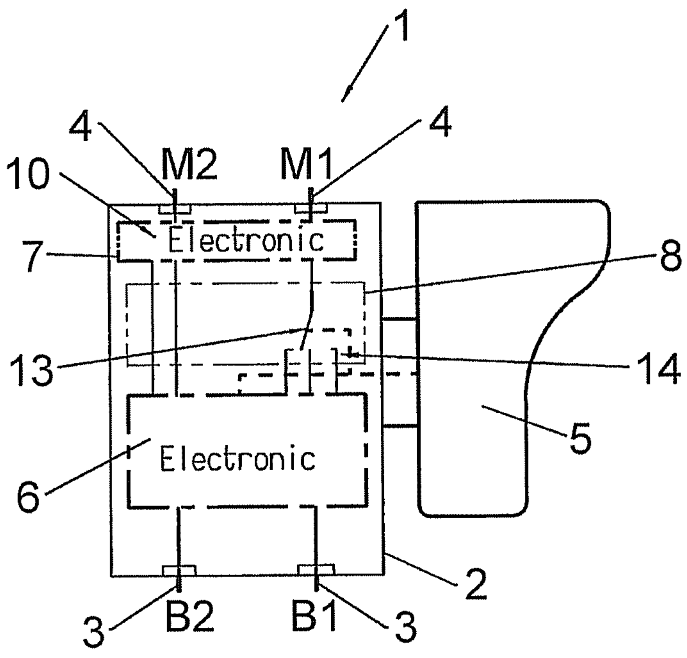
FIG. 3 shows an electric switch in accordance with a third embodiment in a schematic view.

As shown in FIG. 1, the braking circuit 7 is in the form of a mechanical switching contact 9 for short-circuiting the electric motor 16. In another configuration shown in FIG. 2, the braking circuit 7 is in the form of an electronics unit 10 for the short-circuiting braking of the electric motor 16. Expediently, this is an electronics unit 10 which operates in clocked fashion for enabling soft braking. Corresponding to FIG. 1 or FIG. 2, the reversal circuit 8 has mechanical switchover contacts 11, 12 for alternately making contact with the second electrical terminals 4 for the reversal of the direction of rotation of the electric motor 16. In another configuration shown in FIG. 3, the reversal circuit 8 is configured as a circuit for electronically operating reversal of the direction of rotation. For this purpose, the reversal circuit 8 has in each case one branch 13, 14 for the clockwise and counterclockwise rotation of the electric motor 16. The respective branch 13, 14 is supplied with voltage by means of a power circuit, which comprises a power semiconductor and in this case is arranged in the control device 6.

The invention is not restricted to the exemplary embodiments described and illustrated. Instead, it also includes all developments conventional to a person skilled in the art within the scope of the invention defined by the patent claims. It is thus possible for such an electric switch to be used not only for all DC tool switches for DC power tools, in particular drills, drill drivers, saws, hammers, impact screwdrivers or the like, but also for other DC applications outside the power tool sector. Furthermore, the electric switch can also be used in electrical appliances operated on alternating current (AC).

LIST OF REFERENCE SYMBOLS

1: (Electric) switch
2: Housing (of switch)
3: (First electrical) terminal
4: (Second electrical) terminal
5: Actuating mechanism
6: Control device
7: Braking circuit
8: Reversal circuit
9: (Mechanical) switching contact (for braking circuit)
10: Electronics unit (for braking circuit)
11, 12: (Mechanical) switchover contact (for reversal circuit)
13, 14: Branch (for reversal circuit)
15: Electric tool
16: Electric motor
17: Tool
18: Energy store/voltage supply
19: Housing (of electric tool)
20: Switching contact
21: Actuating element (for reversal circuit)

We claim:

1. An electric switch for an electric tool having an electric motor, comprising a switch housing having first electrical terminals for an electrical connection to a voltage supply, second electrical terminals for an electrical connection to the electric motor, an actuating mechanism that can be adjusted between an initial position and a final position, wherein the electric motor is switched off when the actuating mechanism is located in the initial position and is switched on when the actuating mechanism is not located in the initial position, so as to enable operation of the electric motor by said actuating mechanism of the switch, wherein the switch further comprises a braking circuit for braking the electric motor, said braking circuit operating when the actuating mechanism is reset to the initial position, and a reversal circuit for switching over the direction of rotation of the electric motor, wherein the braking circuit is positioned and arranged between the second electrical terminals and the reversal circuit in the switch housing.

2. The electric switch as claimed in claim 1, wherein the actuating mechanism has a switching effect on a switching contact for operating the electric motor when said actuating mechanism is moved out of and/or into the initial position.

3. The electric switch as claimed in claim 1, wherein the switch has a control device for operating, an open-loop and/or closed-loop control of the electric motor, such as the speed, torque or the like thereof, depending on the displacement path of the actuating mechanism.

4. The electric switch as claimed in claim 1, wherein the control device is arranged between the first electrical terminals and the reversal circuit.

5. The electric switch as claimed in claim 1, wherein the switching contact is located between the first electrical terminals and the control device.

6. The electric switch as claimed in claim 1, wherein the braking circuit is in the form of a mechanical switching contact for short-circuiting the electric motor.

7. The electric switch as claimed in claim 1, wherein the braking circuit is in the form of an electronics unit which operates in clocked fashion for short-circuiting braking of the electric motor.

8. The electric switch as claimed in claim 1, wherein the reversal circuit has mechanical switchover contacts for alternately making contact with the second electrical terminals for reversing the direction of rotation of the electric motor.

9. The electric switch as claimed in claim 1, wherein the reversal circuit for electronically operating reversal of the direction of rotation is formed with respective branches for interacting with a power circuit having a power semiconductor in a control device for the clockwise and counterclockwise operation of the electric motor.

* * * * *